US012688215B2

(12) United States Patent
Qiu et al.

(10) Patent No.: US 12,688,215 B2
(45) Date of Patent: Jul. 21, 2026

(54) METHOD AND SYSTEM FOR HIERARCHICAL PERCEIVER FOR MANUFACTURING DATA

(71) Applicant: Robert Bosch GmbH, Stuttgart (DE)

(72) Inventors: Chen Qiu, Pittsburgh, PA (US); Wan-Yi Lin, Wexford, PA (US); Carlos Cunha, Menlo Park, CA (US); Jared Evans, Sunnyvale, CA (US)

(73) Assignee: Robert Bosch GmbH (DE)

( * ) Notice: Subject to any disclaimer, the term of this patent is extended or adjusted under 35 U.S.C. 154(b) by 172 days.

(21) Appl. No.: 18/415,490

(22) Filed: Jan. 17, 2024

(65) Prior Publication Data

US 2025/0231974 A1    Jul. 17, 2025

(51) Int. Cl.
| | |
|---|---|
| *G06F 16/334* | (2025.01) |
| *G06F 40/40* | (2020.01) |
| *G06N 3/04* | (2023.01) |
| *G06N 3/045* | (2023.01) |
| *G06N 3/0455* | (2023.01) |
| *G06N 3/0499* | (2023.01) |

(Continued)

(52) U.S. Cl.
CPC .......... *G06F 16/3347* (2019.01); *G06F 40/40* (2020.01); *G06N 3/04* (2013.01); *G06N 3/045* (2023.01); *G06N 3/0455* (2023.01); *G06N 3/0499* (2023.01); *G06N 3/08* (2013.01); *G06N 20/00* (2019.01)

(58) Field of Classification Search
CPC ....... G06F 16/3347; G06F 40/40; G06N 3/04; G06N 3/045; G06N 3/0455; G06N 3/0499; G06N 3/08; G06N 20/00
See application file for complete search history.

(56) References Cited

U.S. PATENT DOCUMENTS

| | | | |
|---|---|---|---|
| 2023/0145129 A1* | 5/2023 | Jaegle | G06N 3/0475 |
| 2025/0094484 A1* | 3/2025 | Zheng | G06V 10/44 |

OTHER PUBLICATIONS

Jaegle et al, Perceiver IO: A general architecture for structured inputs and outputs, Mar. 15, 2022, ICLR 2022 Conference, https://arxiv.org/abs/2107.14795, pp. i-xxix (Year: 2022).*

(Continued)

*Primary Examiner* — Linda Wong
(74) *Attorney, Agent, or Firm* — Dickinson Wright PLLC

(57) ABSTRACT

A method that includes obtaining, from one or more stations, embedding vectors that embed features of the stations, obtaining measurement vectors and associated measurement names, generating a text array of the measurement names utilizing a language model, concatenating the text array and the measurement vector at one or more cross-attention modules configured to encode one or more measurement arrays to one or more latent embedding vectors, generating one or more latent embedding vectors associated with the measurement vector and corresponding measurement names via the cross-attention module and a fixed-size station embedding vector, outputting the latent embeddings; generating a query vector; generating key vectors value vectors utilizing a latent embedding vector; decoding the latent vectors utilizing the key vector and value vector; utilizing the cross attention modules and query vectors, decoding the latent embedding vectors; and output a predication.

20 Claims, 4 Drawing Sheets

(51) Int. Cl.
     _G06N 3/08_          (2023.01)
     _G06N 20/00_          (2019.01)

(56)                References Cited

OTHER PUBLICATIONS

Jaegle et al, Perceiver: General Perception with Iterative Attention, Jun. 23, 2021, https://arxiv.org/abs/2103.03206 (Year: 2021).*

Sun et al, Machinery Prognostics and High-Dimensional Data Feature Extraction Based on a Transformer Self-Attention Transfer Network, Nov. 15, 2023, https://www.mdpi.com/1424-8220/23/22/9190, pp. 1-17 (Year: 2023).*

Alec Radford et al., "Improving Language Understanding by Generative Pre-Training." Computer Science, Linguistics 2018, 12 Pages.

Piotr Nawrot et al., "Hierarchical Transformers Are More Efficient Language Models." arXiv:2110.13711v2 [cs.LG] Apr. 16, 2022, 13 Pages.

Andrew Jaegle et al., "Perceiver IO: A General Architecture for Structured Inputs & Outputs." ICLR 2022, 29 Pages.

Ashish Vaswani et al., "Attention Is All You Need." 31st Conference on Neural Information Processing Systems (NIPS 2017), Long Beach, CA, USA, 11 Pages.

Noam Shazeer, "GLU Variants Improve Transformer." arXiv:2002.05202v1 [cs.LG] Feb. 12, 2020, 5 Pages.

Jimmy Lei Ba et al., "Layer Normalization." normalizaarXiv:1607.06450v1 [stat.ML] Jul. 21, 2016, 14 Pages.

* cited by examiner

METHOD AND SYSTEM FOR HIERARCHICAL PERCEIVER FOR MANUFACTURING DATA

TECHNICAL FIELD

The present disclosure relates to machine learning networks, including those that utilize a large language model.

BACKGROUND

GPT model is an example of a large language model that may utilize a multi-layer transformer architecture that consists of multiple self-attention layers. The GPT model may be trained to predict the next word token given the previous words tokens. It achieves great success on natural language processing (NLP) tasks. But it does not provide a way to encode hierarchical graph structure, which might occur due to the underlying physical constraints where the data is generated, into the network architecture.

Hierarchical transformers may use an explicit hierarchical architecture to efficiently handle long sentences or paragraphs. They shorten the long sequence with average pooling and attention mechanism and upsample the short sequence with attention upsampling.

Perceiver IO is an example of an autoencoder-style transformer architecture. Perceiver may be a general-purpose architecture that handles data from arbitrary settings while scaling linearly with the size of inputs and outputs. It may utilize a cross-attention module to encode the input array to the latent space, uses a stack of self-attention modules to process the latent array, and uses a cross-attention to decode the latent array.

SUMMARY

A first illustrative embodiment, a system that includes one or more stations that includes at least one or more sensors configured to obtain one or more measurements corresponding to one or more parts; one or more controllers in communication with the one or more stations that includes at least one sensor, the one or more controllers configured to generate one or more embedding vectors each associated with the measurements at the one or more stations; obtaining, from one or more stations, one or more measurement vectors and associated measurement names at each of the one or more stations; utilizing a pre-trained large language model, generate a text embedding array of the associated measurement names at each of the one or more stations; concatenate the text embedding array and the measurement vector to generate a key vector and value vector to one or more cross-attention modules configured to encode one or more measurement arrays to one or more fixed-size latent embedding vectors, wherein the one or more measurement arrays are varying in size; generate one or more latent embedding vectors associated with the measurement vector and corresponding measurement names from the one or more stations utilizing at least the cross-attention module and the fixed-size station embedding vector; outputting the one or more latent embeddings utilizing at least a self-attention module and one or more learnable weight matrices; generate a query vector utilizing a measurement name embedding; generate one or more key vectors and one or more value vectors utilizing the latent embedding vector; utilizing the one or more cross attention modules, decode the one or more latent vectors to generate a corresponding key vector and value vector; utilizing both the one or more cross attention modules and one or more query vectors, decode the one or more latent embedding vectors; and output a prediction associated with one or more stations in response to the decoding.

A second illustrative embodiment discloses a computer-implemented method that includes the steps of obtaining, from one or more stations, learnable fixed-size station embedding vectors that embed potential characteristic features of each of the one or more stations, obtaining, from one or more stations, measurement vectors and associated measurement names at each of the one or more stations, generating a text embedding array of the associated measurement names utilizing at least a pre-trained large language model, concatenating the text embedding array and the measurement vector to generate an key vector and value vector to one or more cross-attention modules configured to encode one or more measurement arrays to one or more fixed-size latent embedding vectors, wherein the one or more measurement arrays are varying in size, generating one or more latent embedding vectors associated with the measurement vector and corresponding measurement names from the one or more stations utilizing at least the cross-attention module and the fixed-size station embedding vector, outputting the one or more latent embeddings in response to utilizing at least a self-attention module and one or more learnable weight matrices, generating a query vector utilizing a measurement name embedding, generating one or more key vectors and one or more value vectors utilizing a latent embedding vector, utilizing the one or more cross attention modules, decoding the one or more latent vectors to generate a corresponding key vector and value vector, utilizing the one or more cross attention modules and one or more query vectors (from measurement name embeddings), decoding the one or more latent embedding vectors (through the generated one or more corresponding key vectors and value vectors), and output a predication associated with one or more stations in response to the decoding.

A third illustrative embodiment, a method that includes obtaining, from one or more stations, embedding vectors that embed features of each of the one or more stations, obtaining measurement vectors and associated measurement names, generating a text embedding array of the associated measurement names utilizing at least a pre-trained large language model, concatenating the text embedding array and the measurement vector at one or more cross-attention modules configured to encode one or more measurement arrays to one or more latent embedding vectors, generating one or more latent embedding vectors associated with the measurement vector and corresponding measurement names via the cross-attention module and a fixed-size station embedding vector, outputting the one or more latent embeddings; generating a query vector; generating one or more key vectors and one or more value vectors utilizing a latent embedding vector; decoding the one or more latent vectors utilizing the key vector and value vector; utilizing the one or more cross attention modules and one or more query vectors, decoding the one or more latent embedding vectors; and output a predication.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

In one embodiment, a model may be parameterized by neural networks to model patterns of manufacturing data. In a production line, a product is typically processed by multiple stations in series. At each station, multiple measurements of the product status may be collected. The manufacturing data may include a sequence of measurements collected from multiple stations in the production line. The stations and measurements may build up a hierarchical graph together. The hierarchical graph structure provides rich prior knowledge for data modeling. The system may propose a novel network architecture to incorporate the hierarchical graph into transformers.

Compared with GPT model, the present disclosure may incorporate the production graph structure into the transformer architecture. The hierarchical graph structure provides important prior knowledge and reduces the computation effort. Compared with other systems, the embodiments may utilize an industrial application specified graph structure. Such a system and method may consider different stations in the production line. The measurements may be grouped with their associated stations. Each station has its own property. The measurements at the same station are encoded and decoded together. The dependencies over stations are modeled in the latent space as well.

Figure 1:
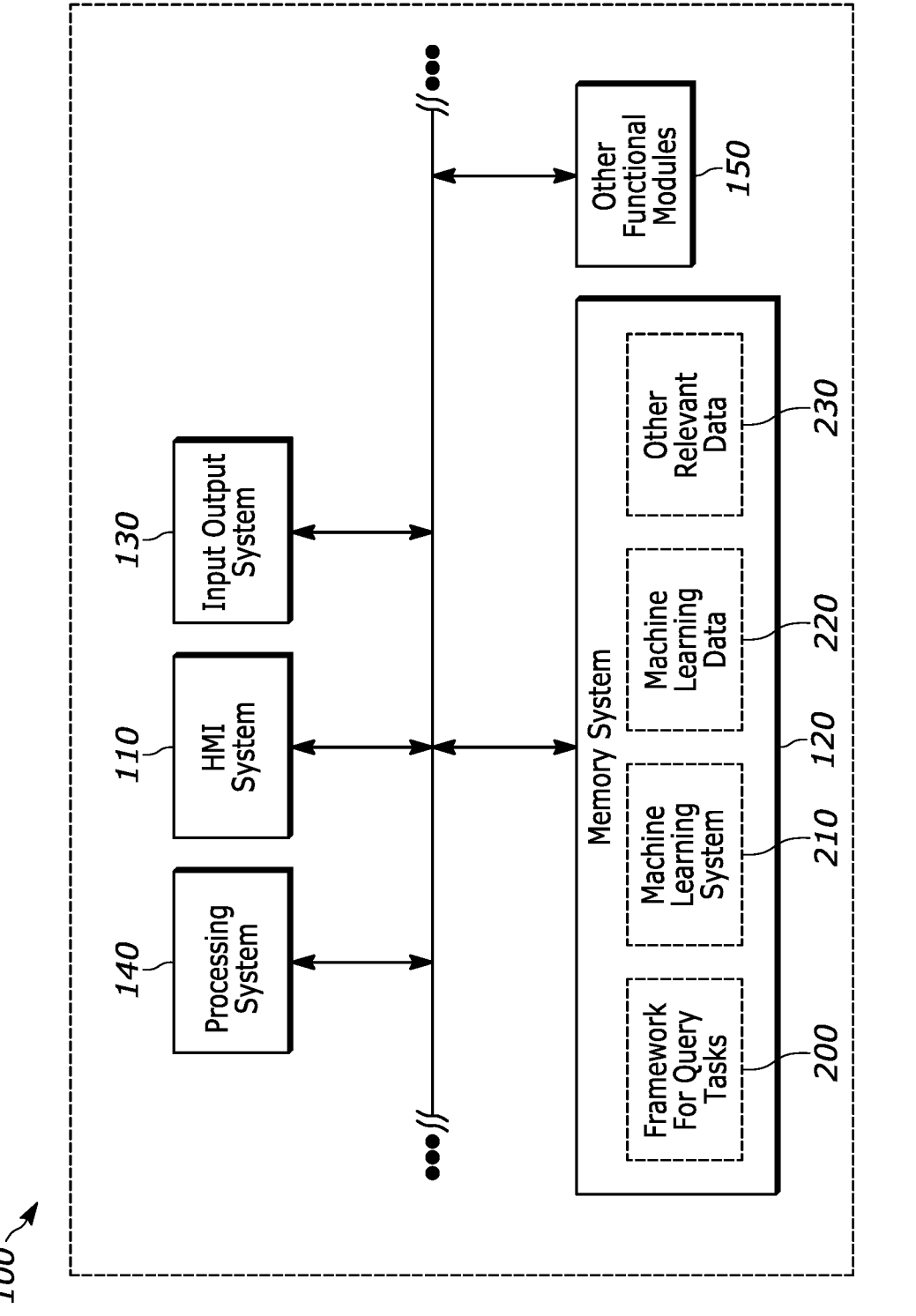
FIG. 1 is a diagram of an example of a system with a framework for query tasks according to an example embodiment of this disclosure.

FIG. 1 is a diagram of an example of a system 100 with a neuro-symbolic framework 200 for query tasks according to an example embodiment. The system 100 is configured to pre-train (or train) the machine learning system 210 via the neuro-symbolic framework 200. In addition, the system 100 is an example of a system configured to perform on the machine learning system 210 via the framework 200. After undergoing pre-training (or both pre-training and zero-shot testing), the system 100 may be configured to employ the machine learning system 210 for use. Alternatively, the system 100 may be configured to enable the pre-trained (or pre-trained and zero-shot tested) machine learning system 210 to be employed and/or deployed in another system (e.g. system 300 of FIG. 3) for use.

The system 100 includes at least a processing system 140. The processing system 140 includes at least an electronic processor, a central processing unit (CPU), a graphics processing unit (GPU), a microprocessor, a field-programmable gate array (FPGA), an application-specific integrated circuit (ASIC), any suitable processing technology, or any number and combination thereof. The processing system 140 is operable to provide the functionality of the framework 200 and the machine learning system 210, as described herein.

The system 100 includes at least a memory system 120, which is operatively connected to the processing system 140. In an example embodiment, the memory system 120 includes at least one non-transitory computer readable medium, which is configured to store and provide access to various data to enable at least the processing system 140 to perform the operations and functionalities with respect to the framework 200 and corresponding machine learning system 210, as disclosed herein. In an example embodiment, the memory system 120 comprises a single computer readable storage device or a plurality of computer readable storage devices. The memory system 120 can include electrical, electronic, magnetic, optical, semiconductor, electromagnetic, or any suitable storage technology that is operable with the system 100. For instance, in an example embodiment, the memory system 120 can include random access memory (RAM), read only memory (ROM), flash memory, a disk drive, a memory card, an optical storage device, a magnetic storage device, a memory module, any suitable type of memory device, or any number and any combination thereof. With respect to the processing system 140 and/or other components of the system 100, the memory system 120 is local, remote, or a combination thereof (e.g., partly local and partly remote). For example, the memory system 120 can include at least a cloud-based storage system (e.g. cloud-based database system), which is remote from the processing system 140 and/or other components of the system 100.

The memory system 120 includes at least the framework 200, the machine learning system 210, machine learning data 220, and other relevant data 230, which are stored thereon and accessible therefrom. The framework 200 includes computer readable data that, when executed by the processing system 140, is configured to generate at least one training set with a suitable number of query tasks for the machine learning system 210. In addition, the framework 200 includes computer readable data that, when executed by the processing system 140, is configured to implement a zero-shot testing process (or a zero-shot evaluation process) to evaluate the pre-trained (or trained) machine learning system 210 with respect to various commonsense tasks. The computer readable data can include instructions, code, routines, various related data, any software technology, or any number and combination thereof.

In an example embodiment, the machine learning system 210 includes at least one machine learning model. More specifically, the machine learning system 210 includes at least one language model. For example, the machine learning system 210 includes a large language model (LLM), or any number language models and combination thereof.

In an example embodiment, the machine learning data 220 includes various data, which the framework 200 uses to train, test, and develop the machine teaming system 210. For example, the machine learning data 220 includes a global knowledge graph 220A. The global knowledge graph 220A is generated by combining various knowledge graphs 220B. The machine learning data 220 may also include one or more knowledge bases, which are associated with one or more of the knowledge graphs 220B. The machine learning data 220 also includes a set of commonsense task datasets 220C, which cover a diverse set of tasks. In addition, the machine learning data 220 may also include various annotations, various loss data, various parameter data, as well as any related data that enables the neuro-symbolic framework 200 and the machine learning system 210 to perform the functions as described herein while meeting certain performance criteria. Meanwhile, the other relevant data 230 provides various data (e.g. operating system, etc.), which enables the system 100 to perform the functions as discussed herein.

In an example embodiment, as shown in FIG. 1, the system 100 is configured to include at least one human machine interface (HMI) system 110. The HMI system 110 includes at least one user interface, at least one HMI device, or any number of combination thereof. For example, the HMI system 110 may include a visual user interface, an auditory user interface, a tactile user interface, any suitable user interface, or any number and combination thereof. The HMI system 110 is operable to communicate with the I/O system 130. The HMI system 110 is also operable to communicate with one or more other components (e.g., processing system 140, memory system 120, etc.) of the system 100. More specifically, for example, the processing system 140 is configured to obtain or extract a query or a query task directly or indirectly from the HMI system 110, the memory system 120, and/or the I/O system 130. Upon receiving the query or query task, the processing system 140 is configured to provide a predicted answer to the query or query task via the machine learning system 210.

In addition, the system 100 includes other components that contribute to the training and/or execution of the framework 200 and the machine learning system 210. For example, as shown in FIG. 1, the memory system 120 is also configured to store other relevant data 230, which relates to operation of the system 100 in relation to one or more components (e.g., sensor system 110, I/O system 130, and other functional modules 150). In addition, the VO system 130 may include an VO interface and may include one or more devices (e.g., microphone, keyboard device, touch display device, microphone, mouse, speaker device, etc.). Also, the system 100 includes other functional modules 150, such as any appropriate hardware technology, software technology, or combination thereof that assist with or contribute to the functioning of the system 100. For example, the other functional modules 150 include communication technology that enables components of the system 100 to communicate with each other as described herein. Accordingly, with at least the components shown in FIG. 1, the system 100 is configured to execute the framework 200 to pre-train (or train) the machine learning system 210 to perform well across various query tasks (e.g. question-answering tasks) in a zero-shot setting or when deployed/employed for use in an application.

Figure 2:
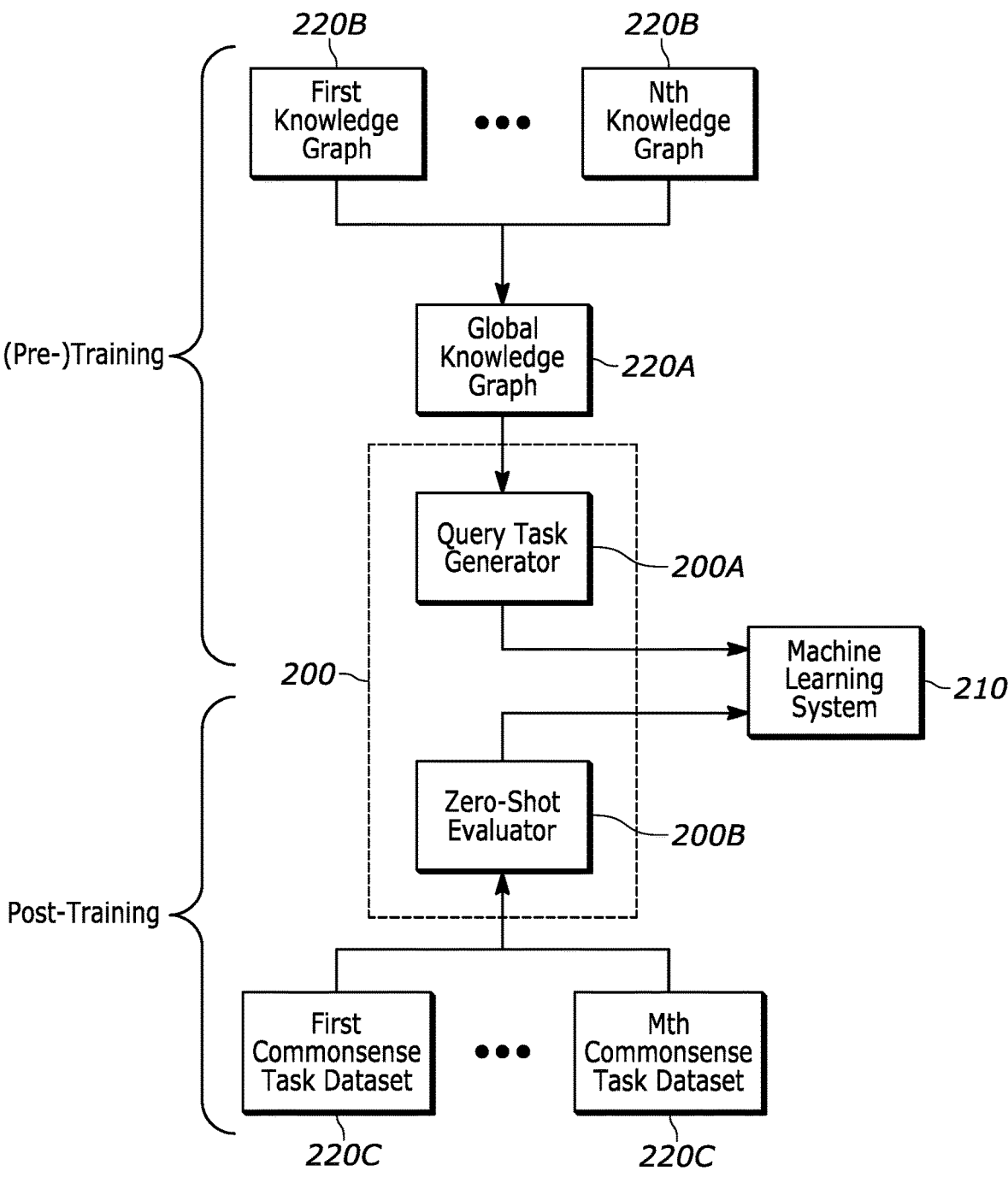
FIG. 2 is a conceptual diagram of an example of the framework for query tasks with respect to the machine learning system according to an example embodiment of this disclosure.

FIG. 2 is a conceptual diagram of an embodiment of neuro-symbolic framework 200 with respect to a machine learning system 210. In an example embodiment, the framework 200 includes at least a query task generator 200A. The query task generator 200A may be configured to obtain data structures (e.g., triples) from a global knowledge graph 220A. As shown in FIG. 2, the global knowledge graph 220A includes a number of distinct knowledge graphs 220B, where the total number of knowledge graphs 220B is represented by "N" in FIG. 2. In this regard, "N" represents an integer number that is at least greater than two. The query task generator 200A is configured to generate query tasks based on the data structures of the global knowledge graph 220A. The query task generator 200A is configured to create a training set that includes a suitable number of query tasks. The query task generator 200A is configured to pre-train or train the machine learning system 210 with at least one training set. The query task generator 200A is also configured to compute at least one score for the machine learning system 210 and fine-time the machine learning system 210, for example, based on the score data, the loss data, and/or any other relevant data. The query task generator 200A ensures that the machine learning system 210 is pre-trained or trained to perform well across various commonsense tasks when tested in a zero-shot setting and/or when deployed/employed for use in an application.

In addition, the framework 200 is configured to include a zero-shot evaluator 200B. The zero-shot evaluator 200B is configured to perform zero-shot testing on the machine learning system 210. As indicated in FIG. 2, the zero-shot evaluator 200B is configured to perform the zero-shot testing during a post-training phase. The post-training phase refers to any phase that occurs after the pre-training (or training) of the machine learning system 210 with at least one training set that is generated by the query task generator 200A. The zero-shot evaluator 200B is configured to test the machine learning system 210 with a commonsense task dataset 220C in a zero-shot manner. In this regard, the machine learning system 210 is configured to process each commonsense task dataset 220C without having observed that commonsense task dataset 220C beforehand. The zero-shot evaluator 200B is configured to obtain a set of commonsense task datasets 220C and apply each commonsense task dataset 220C to the machine learning system 210. The set of commonsense task datasets 220C includes a number of commonsense task datasets 220C, where the total number of commonsense task datasets 220C is represented by 'M' in FIG. 2. In this regard, "M" represents an integer number that is at least greater than two. Each commonsense task dataset 220C is distinct from the other commonsense task datasets 220C of the set, for example, with respect to the format of the query task and/or the knowledge type associated with the query task. With the various commonsense task datasets 220C, the zero-shot evaluator 200B is advantageously configured to demonstrate the effectiveness of the pre-training (or training) of the machine learning system 210 based on the training set that was generated by the query task generator 200A. In this regard, the zero-shot evaluator 200B is configured to provide a robust measure of the reasoning abilities of the machine learning system 210. The zero-shot evaluator 200B is also configured to evaluate the machine learning system 210 along with the impact of the pre-training across various commonsense task dataset 220C.

As aforementioned, the set of commonsense task datasets 220C includes various commonsense task datasets 220C. Each commonsense task dataset 220C is distinct from the training set, which is generated by the query task generator 200A. The set of commonsense task datasets 220C are datasets, which the machine learning system 210 has not observed at all during its pre-training phase or training phase. In this regard, the set of commonsense task datasets 220C are selected to cover a diverse set of tasks, for instance, with respect to at least format (e.g., question answering, pronoun resolution, natural language inference, etc.), knowledge type (e.g., social knowledge, physical knowledge, etc.), or both format and knowledge type. For example, there may be a task dataset 220C that includes a natural inference task, where a beginning and ending of a story are given and where the task is to choose the more plausible hypotheses out of a set of response options. In addition, there may be a task dataset 220C that includes a broad range of commonsense aspects, where the task is to respond to a question by selecting one of five response options. As another example, there may be a task dataset 220C that focuses on physical reasoning, where the task is to pick a more plausible response option out of two possible continuations. Also, there may be a task dataset 220C that focuses on reasoning based on social interactions, where the task includes some context, a question, and a set of response options. As yet another example, there may be a task dataset 220C that involves pronoun resolution, where the task includes some context, an emphasized pronoun, and response options that are offered as possible references. Furthermore, the set of commonsense task datasets 220C are not limited to the aforementioned commonsense task datasets 220C, but may include any task dataset 220C that is suitable for performing zero-shot testing on the machine learning system 210.

Figure 3:
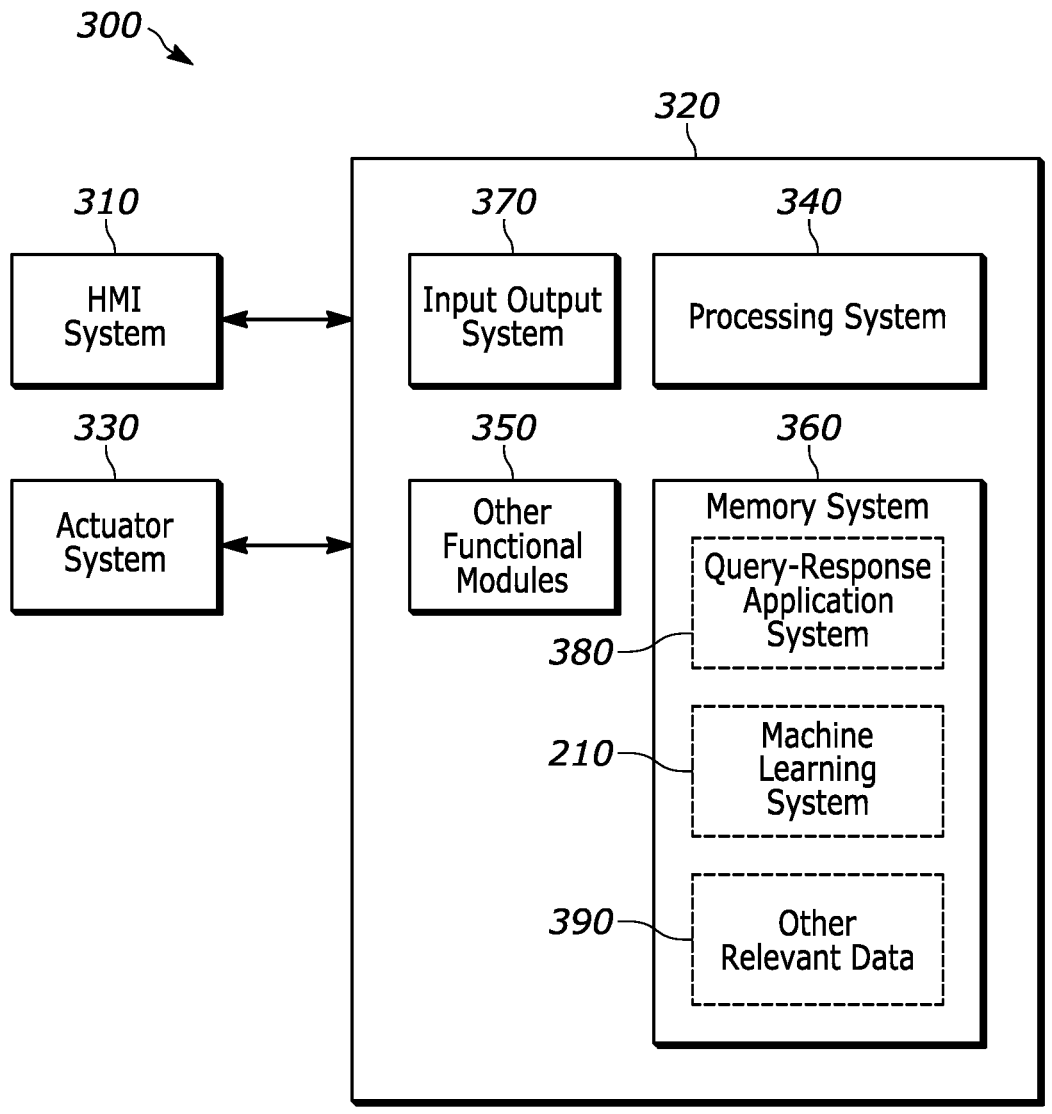
FIG. 3 is a diagram of an example of a control system that employs the machine learning system of FIG. 1 according to an example embodiment of this disclosure.

FIG. 3 is a diagram of a system 300, which is configured to include at least the pre-trained (or trained) machine learning system 210. In this regard, the system 300 includes at least an HMI system 310, a control system 320, and an actuator system 330. The system 300 is configured such that the control system 320 controls the actuator system 330 based on the input received from the HMI system 310. More specifically, the HMI system 310 includes one or more user interfaces and/or devices that communicate with one or more I/O devices of the IVO system 370. Upon obtaining input, the HMI system 310 is operable to communicate with the control system 320 via the input/output (I/O) system 370 and/or other functional modules 350, which includes communication technology.

The control system 320 is configured to obtain input from the HMI system 310. Upon receiving input, the control system 320 is operable to process the input via a processing system 340. In this regard, the processing system 340 includes at least one processor. For example, the processing system 340 includes an electronic processor, a central processing unit (CPU), a graphics processing unit (GPU), a microprocessor, a field-programmable gate array (FPGA), an application-specific integrated circuit (ASIC), processing circuits, any suitable processing technology, or any combination thereof. Upon processing at least the input received from the HI system 310, the processing system 340 is operable to provide the machine learning system 210 with a query or query task based on the input. The processing system 340 is also configured to generate a predicted answer via the machine learning system 210. The processing system 340 is configured to generate output data based on the predicted answer. The processing system 340 is configured to provide the output data and/or the predicted answer to the user via the I/O system 370 and/or the HMI system 310. In addition, the processing system 340 is operable to generate actuator control data based on the output data and/or the predicted answer. The control system 320 is configured to control the actuator system 330 according to the actuator control data.

The memory system 360 is a computer or electronic storage system, which is configured to store and provide access to various data to enable at least the operations and functionality, as disclosed herein. The memory system 360 comprises a single device or a plurality of devices. The memory system 360 includes electrical, electronic, magnetic, optical, semiconductor, electromagnetic, any suitable memory technology, or any combination thereof. For instance, the memory system 360 may include random access memory (RAM), read only memory (ROM), flash memory, a disk drive, a memory card, an optical storage device, a magnetic storage device, a memory module, any suitable type of memory device, or any number and combination thereof. In an example embodiment, with respect to the control system 320 and/or processing system 340, the memory system 360 is local, remote, or a combination thereof (e.g., partly local and partly remote). For example, the memory system 360 is configurable to include at least a cloud-based storage system (e.g. cloud-based database system), which is remote from the processing system 340 and/or other components of the control system 320.

The memory system 360 includes the machine learning system 210, which has been pre-trained (or trained) via the framework 200 (FIGS. 1-2). This pre-trained or trained machine learning system 210 is configured to be implemented, executed, and/or employed via the processing system 340. In this regard, the machine learning system 210 is configured to receive and process a query or query task as input data. The machine learning system 210 is configured to provide a predicted answer in response to the query or query task. In this regard, the machine learning system 210 is configured to perform question-answering.

In addition, the memory system 360 includes a query-response application system 380. The query-response application system 380 is configured to ensure that the machine learning system 210 is provided with a query or a query task as input data. In this regard, the processing system 340, via the query-response application system 380, is configured to process the input from the HMI system 310. If deemed necessary, the query-response application system 380 is configured to generate a query or query task upon processing the input from the HMI system 310. In addition, in some instances, the query-response application system 380 is configured to generate output data based on the predicted answer obtained from the machine learning system 210. In general, the query-response application system 380 enables the machine learning system 210 to operate seamlessly as a part of the control system 320 for the desired application.

Furthermore, as shown in FIG. 3, the system 300 includes other components that contribute to operation of the control system 320 in relation to the HMI system 310 and the actuator system 330. For example, as shown in FIG. 3, the memory system 360 is also configured to store other relevant data 390, which relates to the operation of the system 300. Also, as shown in FIG. 3, the control system 320 includes the VO system 370, which includes one or more/O devices that relate to the system 100. Also, the control system 320 is configured to provide other functional modules 350, such as any appropriate hardware technology, software technology, or any combination thereof that assist with and/or contribute to the functioning of the system 300. For example, the other functional modules 350 include an operating system and communication technology that enables components of the system 300 to communicate with each other as described herein. Also, the components of the system 300 are not limited to this configuration, but may include any suitable configuration as long as the system 300 performs the functionalities as described herein. For example, the HMI system 310 may be a more integral part of the IVO system 370 and/or the control system 320. Accordingly, the system 300 is useful in various applications.

For example, as a non-limiting example, the system 300 may be a dialogue system, which is used to provide customer service and/or troubleshooting assistance. In this case, the system 300 does not further include the actuator system 330. In this regard, for instance, the HMI system 310 may include a user interface, which operates with the I/O system 370, such as a touchscreen device, to receive input from a user. Upon entering input data into the touchscreen device, the processing system 340 is configured to provide a query or query task to the pre-trained or trained machine learning system 210. In response to the query or query task, the processing system 340 is configured to provide a predicted answer via the machine learning system 210. The processing system 340 is configured to provide the predicted answer directly or indirectly as output data, which is received by the user via the touchscreen device.

Figure 4:
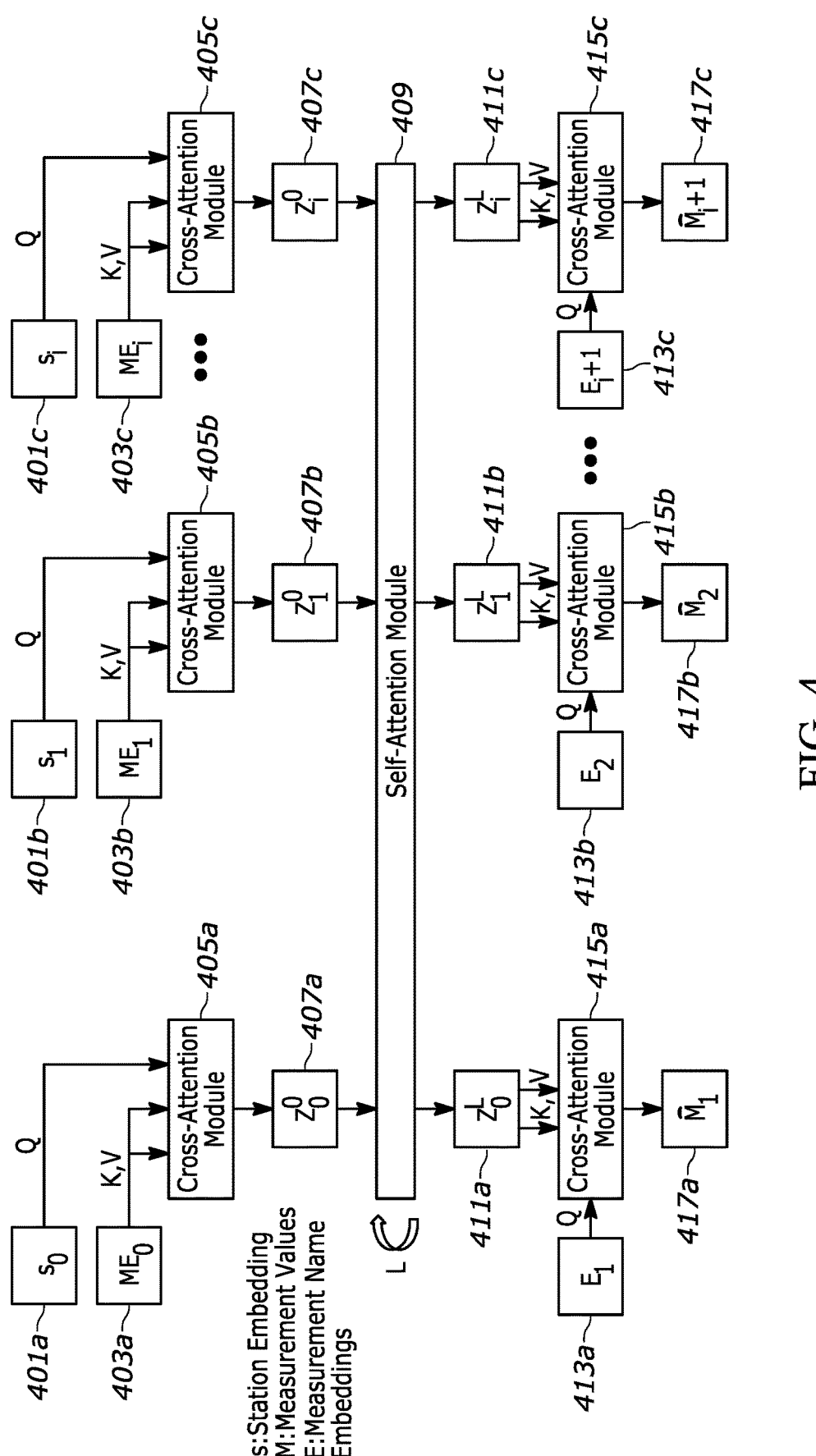
FIG. 4 illustrates an overview of system utilizing both a cross-attention module and a self-attention module for manufacturing parts.

FIG. 4 illustrates an overview of system utilizing both a cross-attention module and a self-attention module for manufacturing parts. The disclosure may be used to build machine-learning (ML) models to model the patterns of manufacturing data. The learned ML model can be utilized for anomaly detection, anomaly prediction, root cause analysis, and other optimization or data analytics for production.

In one embodiment, a novel transformer architecture may include cross-attention modules and self-attention modules. Cross-attention modules and self-attention modules may be commonly used in language models. Both cross-attention and self-attention modules consist of a multi-head attention layer (with layer normalization) and a feed-forward network composed of linear layers with GEGLU activations as $$\phi = f \circ MHA(Q, K, V).$$

Cross-attention may combine asymmetrically two separate sequences in computing Q, K, V, in contrast self-attention computes Q, K, V with a single sequence. The detailed calculation of multi-head attention may be known in the art.

Given a set of measurements and the associated production graph, the disclosure may be utilized to incorporate the production graph structure into transformers. With prior knowledge of the production graph, the transformers can better model the manufacturing data.

In a production line, the system and method may have a sequence of T stations with their associated learnable station embedding vectors $s_{1:T} = (s_1, s_2, \dots, s_T)$ where $s_i \in \mathbb{R}^D$. A product may processed by T stations one by one. At station $s_i$, the system and method may have a measurement vector $M_i \in \mathbb{R}^{N_i \times 1}$ where $N_i$ is varying at each station. The system and method may also have the associated measurement names at each station. The system and method may use a pre-trained large language model to get a text embedding array $E_i \in \mathbb{R}^{N_i \times C}$ of the measurement names.

The system may concatenate the text embedding array $E_i \in \mathbb{R}^{N_i \times C}$ and the measurement vector $M_i \in \mathbb{R}^{N_i \times 1}$ as the input $ME_i \in \mathbb{R}^{N_i \times (C+1)}$. A cross-attention module serves as an encoder $\phi_{enc} = f_{enc} \circ MHA_{enc}$ that encodes the varying size measurement arrays $ME_{1:T}$ to fixed size latent vectors $$z^0_{1:T}$$

where $$z^0_i$$

$\in \mathbb{R}^D$. The encoder $\phi_{enc}$ is shared cross stations. The encoder $\phi_{enc}$ has a multi-head attention layer $MHA_{enc}$ (with layer normalization) followed by a feed-forward network $f_{enc}$ composed of linear layers with GEGLU activations. The core component is the multi-head attention layer $MHA_{enc}$ $$(Q^i_{enc}, K^i_{enc}, V^i_{enc}).$$

The key $$K^i_{enc}$$

and value $$V^i_{enc}$$

are derived from the measurement array $MV_i$ with learnable weight matrices $$W^K_{enc}$$

and $$W^V_{enc}$$

of shape $((C+1) \times D)$ as $$K^i_{enc} = ME_i W^K_{enc}, \quad V^i_{enc} = ME_i W^V_{enc},$$

The query $$Q^i_{enc}$$

is derived from the learnable station embedding $s_i$ with learnable weight matrix $$W^Q_{enc}$$

of shape $(D \times D)$ as $$Q^i_{enc} = s_i W^Q_{enc}.$$

By feeding measurement array at each station to the encoder, the system may have the embedding vector for each station as $$z^0_i = \phi_{enc}(ME_i; s_i).$$

With respect to processing, the product may be processed by the stations. The product is process by T stations sequentially. A latent transformer made up of L self-attention modules $$\phi^l_{latent} = f^l_{latent} \circ MHA^l_{latent}$$

with $l \in \{1, \ldots, L\}$ are used to model the inter-station temporal dependencies. Each self-attention module has a multi-head attention layers (with layer normalization) followed by a feed-forward network composed of linear layers with GEGLU activations. Different than cross-attention modules, the $$MHA^l_{latent}\left(Q^l_{latent}, K^l_{latent}, V^l_{latent}\right)$$

in the self-attention module $$\phi^l_{latent}$$

has $$Q^l_{latent}, K^l_{latent}, V^l_{latent}$$

derived from $$z^{l-1}_{1:T}. \; Q^l_{latent}, K^l_{latent}, V^l_{latent}$$

are computed with learnable weight matrices $$W^{l,Q}_{latent}, W^{l,K}_{latent}, W^{l,V}_{latent}$$

of shape (D×D) as $$Q^l_{latent} = z^{l-1}_{1:T} W^{l,Q}_{latent}, K^l_{latent} = z^{l-1}_{1:T} W^{l,K}_{latent}, V^l_{latent} = z^{l-1}_{1:T} W^{l,V}_{latent},$$

The latent embeddings $$z^0_{1:T}$$

are processed by L self-attention modules. With each module, we have $$z^l_{1:T} = \phi^l_{latent}\left(z^{l-1}_{1:T}\right).$$

Where $$z^l_i$$

$$\in \mathbb{R}^D$$

A cross-attention module serves as an decoder $\phi_{dec} = f_{dec} \circ MHA_{dec}$ that decodes the latent vector $$z^L_i$$

with the query $E_{i+1} \in \mathbb{R}^{N_{i+1} \times C}$ to the prediction array $\hat{M}_{i+1} \in \mathbb{R}^{N_{i+1} \times 1}$. The decoder $\phi_{dec}$ is shared cross stations. The decoder $\phi_{dec}$ has a multi-head attention layer $MHA_{dec}$ (with layer normalization) followed by a feed-forward network $f_{dec}$ composed of linear layers with GEGLU activations. The core component is the multi-head attention layer $$MHA_{dec}\left(Q^i_{dec}, K^i_{dec}, V^i_{dec}\right).$$

The key $$K^i_{dec}$$

and value $$V^i_{dec}$$

are derived from the measurement array $$z^L_i$$

with learnable weight matrices $$W^K_{dec} \text{ and } W^V_{dec}$$

of shape (D×D) as $$K^i_{dec} = z^L_i W^K_{dec}, V^i_{dec} = z^L_i W^V_{dec},$$

The query $$Q^i_{dec}$$

is derived from the measurement name embedding $E_{i+1}$ with learnable weight matrix $$W_{dec}^Q$$

of shape (C×D) as $$Q_{dec}^i = E_{i+1} W_{dec}^Q.$$

The feed-forward network $f_{dec}$ maps the outputs of the multi-head attention layer $$MHA_{dec}(Q_{dec}^i, K_{dec}^i, V_{dec}^i)$$

to the measurement value space.

By feeding the latent vector $$Z_i^L$$

at each station and the measurement name query $E_{i+1}$ to the decoder $\phi_{dec}$, the system predict the measurements at next station $$\hat{M}_{i+1} = \phi_{dec}(z_i^L; E_{i+1}).$$

With respect to training, the system may utilize all parameters of the encoder, latent transform, the decoder, and the learnable station embedding vectors. They may be updated by minimizing the mean square error between the ground-truth measurement values and the model predicted measurement values.

At station 401*a*, 401*b*, 401*c* or sensor 401*a*, 401*b*, 401*c* may be in communication with a cross-attention module 405*a*, 405*b*, 405*c*. The corresponding station may be in communication with the corresponding cross-attention module, for example station 401*b* in communication with cross attention module 405*b*. The station and sensors may collect multiple data in a sequence of measurements collected from multiple stations in the production line. The station and sensors can include multiple different sensors. The station embedding may monitor both a part or monitor characteristics associated with a part. Each of the stations may have different sensors or names of the sensors, as well as a different characteristic proxy. The station embedding may be a learnable embedding vector to contain characteristics utilized to distinguish behavior differently of parts. The station 401 may output a query vector at each of the stations that correspond to some type of measurement of a production part. A vector may be sent to the cross-attention module 405*a*, 405*b*, 405*c*. The query vector may be a mathematical representation of a query in a vector space, allowing for efficient comparison and retrieval of information in a manner that captures semantic relationships between various words, phrases, measurements, etc.

Measurement embeddings 403*a*, 403*b*, 403*c* may be derived from the various stations. The corresponding station may be in communication with the corresponding measurement embedding, for example station 401*b* in communication with measurement embedding module 403*b*.

The cross-attention module 405*a*, 405*b*, 405*c*, may output a z-vector 407*a*, 407*b*, 407*c*. The z-vector 407*a*, 407*b*, 407*c* may be a result of the output of a layer in the neural network (e.g., the cross attention module 405*a*, 405*b*, 405*c*) or from the attention mechanism. The z-vector 407*a*, 407*b*, 407*c* may be produced by the encoder of the cross-attention module 405*a*, 405*b*, 405*c*. The cross-attention model may be used to encode the varying-length measurements to a latent embedding vector with the same size of the fixed-size station embedding vector and to decode the fixed-size latent embedding vector to a prediction with the same size of a varying-length measurement name embeddings.

The encoder might produce a set of representations for the input sequences, and then the cross-attention mechanism may be applied to generate the z-vectors for each element in the target sequence based on the information from the source sequence.

The self-attention module 409 may receive as an input the various z-vectors 407*a*, 407*b*, 407*c*. The self-attention mechanism allows the model to weigh different words in a sequence differently when processing a specific word, capturing dependencies regardless of their positions in the sequence. The self-attention mechanism may operates on three vectors for each word in the input sequence: Query (Q), Key (K), and Value (V). These vectors are derived from the input embeddings of the words.

The self-attention module 409 may operate on each word, the attention scores may be computed by taking the dot product of its Query vector with the Key vectors of all other words in the sequence. This results in a set of attention scores that represent the importance of other words for the current word. The attention scores may go through a softmax function, converting them into probabilities. These probabilities are then used to weight the corresponding Value vectors. The weighted sum of these Value vectors may give us the representation of the current word, considering its relationships with other words. Multi-Head Attention: To enhance the model's capability to capture different types of relationships, self-attention is often implemented with multiple heads. Each head has its own set of Query, Key, and Value weight matrices, and the outputs from all heads are concatenated and linearly transformed. The self-attention mechanism allows the model to consider different words in the context of the current word, capturing both short and long-range dependencies in the input sequence. This has proven to be highly effective for tasks like machine translation, text summarization, and other natural language processing tasks. Thus, the self-attention module 409 may cross multiply at each station to summarize measurements and vectors from multiple stations.

The self-attention module 409 may output a latent embedding 411*a*, 411*b*, 411*c* corresponding to each station. The cross-attention modules 415*a*, 415*b*, 415*c* may decode each of the latent vectors. The decoder may have a multi-head attention layer (with layer normalization) followed by a feed-forward network composed of linear layers with GEE-GLU activations. The key values of K-vectors and V-vectors may be derived from the measurement array with learnable weight matrices. The latent embedding 411*a*, 411*b*, 411*c* may The key $$K_{dec}^i$$

and value $$V_{dec}^i$$

are derived from the measurement array $$z_i^L$$

with learnable weight matrices $$W_{dec}^K \text{ and } W_{dec}^V$$

of shape (D×D) as $$K_{dec}^i = z_i^L W_{dec}^K, \ V_{dec}^i = z_i^L W_{dec}^V,$$

The query $$Q_{dec}^i$$

may be derived from the measurement name embedding $E_{i+1}$ with learnable weight matrix $$W_{dec}^Q$$

of shape (C×D) as $$Q_{dec}^i = E_{i+1} W_{dec}^Q.$$

The feed-forward network $f_{dec}$ may map the outputs of the multi-head attention layer $MHA_{dec}$ $$\left(Q_{dec}^i, K_{dec}^i, V_{dec}^i\right)$$

to the measurement value space.

By feeding the latent vector $$z_i^L$$

at each station and the measurement name query $E_{i+1}$ 413a, 413b, 413c to the decoder $\phi_{dec}$, the system predict the measurements at next station $$\hat{M}_{i+1} = \phi_{dec}($$

$$z_i^L;$$

$E_{i+1}$). The measurement predictions 417a, 417b, 417c, may be utilized to aggregate a predicted measurement value of all stations.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A system, comprising:

one or more stations that includes at least one or more sensors configured to obtain one or more measurements corresponding to one or more parts;

one or more controllers in communication with the one or more stations that includes at least one sensor, the one or more controllers configured to:

generate, for each station, one or more embedding vectors each associated with the measurements at the one or more stations;

obtaining, from one or more stations, one or more measurement vectors and associated measurement names at each of the one or more stations;

utilizing a pre-trained large language model, generate a text embedding array of the associated measurement names at each of the one or more stations, wherein the text embedding array represent one or more measurement names that uniquely identify the corresponding station and its associated sensor measurements;

concatenate, on a per-station basis, the text embedding array and the measurement vector to generate a key vector and value vector;

provide the corresponding key vector and value vector to one or more cross-attention modules configured to encode one or more station-specific measurement arrays of varying length to one or more fixed-size latent embedding vectors, wherein the one or more measurement arrays are varying in size;

generate, utilizing at least the cross-attention module and a fixed-size station embedding vector, one or more latent embedding vectors associated with the measurement vector and corresponding measurement names from the one or more stations;

outputting the one or more latent embedding vectors utilizing at least a self-attention module and one or more learnable weight matrices;

generate a query vector utilizing a measurement name embedding;

generate one or more key vectors and one or more value vectors utilizing the one or more latent embedding vectors;

utilizing the one or more cross attention modules, decode the one or more latent vectors to generate a corresponding key vector and value vector;

utilizing both the one or more cross attention modules and one or more query vectors, decode the one or more latent embedding vectors; and output a prediction associated with one or more stations in response to the decoding.

2. The system of claim 1, wherein the one or more cross-attention modules include a multi-head attention layer with layer normalization.

3. The system of claim 1, wherein the self-attention module includes a feed-forward network that includes a one or more linear layers with GEGLU activations.

4. The system of claim 1, wherein the pre-trained large language model includes a GPT model.

5. The system of claim 1, wherein one or more embedding vectors include a query vector, a key vector, and a value vector associated with the one or more stations.

6. The system of claim 5, wherein one or more attention scores are computed by obtaining a dot product of the query vector with the key vector of all other words of the sequence.

7. The system of claim 1, wherein the self-attention module includes a latent transformer.

8. The system of claim 6, wherein the dot product is processed by the stations sequentially.

9. The system of claim 1, wherein the query is derived from the measurement name embedding with a learnable weight matrix of a shape.

10. The system of claim 1, wherein parameters associated with the encoder, latent transformer, the decoder, and the learnable station embedding vectors are updated by minimizing the mean square error between the ground-truth measurement values and the model predicted measurement values.

11. A computer-implemented method, comprising:

obtaining, from each of one or more stations, learnable fixed-size station embedding vectors configured to embed characteristic features of each of the one or more stations;

obtaining, from one or more stations, measurement vectors and associated measurement names at each of the one or more stations;

generating a text embedding array of the associated measurement names utilizing at least a pre-trained large language model, wherein the text embedding array represent one or more measurement names that uniquely identify the corresponding station and its associated sensor measurements;

concatenating the text embedding array and the measurement vector to generate an key vector and value vector to one or more cross-attention modules configured to encode one or more measurement arrays to one or more fixed-size latent embedding vectors, wherein the one or more measurement arrays are varying in size;

generating one or more latent embedding vectors associated with the measurement vector and corresponding measurement names from the one or more stations utilizing at least the cross-attention module and a fixed-size station embedding vector;

outputting the one or more latent embeddings utilizing at least a self-attention module and one or more learnable weight matrices;

generating a query vector utilizing a measurement name embedding;

generating one or more key vectors and one or more value vectors utilizing the latent embedding vector;

utilizing the one or more cross attention modules, decoding the one or more latent vectors with the key vectors and value vectors;

utilizing the one or more cross attention modules and one or more query vectors (from measurement name embeddings, decoding the one or more latent embedding vectors via the key vectors and value vectors; and output a predication associated with one or more stations in response to the decoding.

12. The method of claim 11, wherein the measurement vector is varying at each of the one or more stations.

13. The method of claim 11, wherein the decoding the one or more latent embedding vectors is via the generated one or more corresponding key vectors and value vectors.

14. The method of claim 11, wherein utilizing the one or more cross attention modules and one or more query vectors are derived from measurement name embeddings.

15. A computer-implemented method, comprising:

obtaining, from one or more stations, learnable station embedding vectors that embed potential characteristic features of each of the one or more stations;

obtaining, from one or more stations, measurement vectors and associated measurement names at each of the one or more stations;

generating a text embedding array of the associated measurement names utilizing at least a pre-trained large language model, wherein the text embedding array represent one of more measurement names that uniquely identify the corresponding station and its associated sensor measurements;

concatenating the text embedding array and the measurement vector at one or more cross-attention modules configured to encode one or more measurement arrays to one or more latent embedding vectors, wherein the one or more measurement arrays are varying in size;

generating one or more latent embedding vectors associated with the measurement vector and corresponding measurement names from the one or more stations utilizing at least the cross-attention module and a fixed-size station embedding vector configured to serve as the query vector;

outputting the one or more latent embeddings in response to utilizing at least a self-attention module and one or more learnable weight matrices;

generating a query vector utilizing a measurement name embedding;

generating one or more key vectors and one or more value vectors utilizing a latent embedding vector;

utilizing the one or more cross attention modules, decoding the one or more latent vectors utilizing the key vector and value vector;

utilizing the one or more cross attention modules and one or more query vectors, decoding the one or more latent embedding vectors; and output a predication associated with one or more stations in response to the decoding.

16. The computer-implemented method of claim 15, wherein the one or more latent embedding vectors are of a fixed-size.

17. The computer-implemented method of claim 15, wherein the one or more query vectors are generated from measurement name embeddings.

18. The computer-implemented method of claim 15, wherein decoding the one or more latent embedding vectors is accomplished via utilization of the one or more key vectors and value vectors.

19. The computer-implemented method of claim 15, wherein the one or more stations are associated with a production line for manufacturing one or more components.

20. The computer-implemented method of claim 15, wherein the one on or more pretrained large language models are configured to utilize graph structures.

* * * * *